United States Patent [19]

Stuck

[11] Patent Number: 5,640,896
[45] Date of Patent: Jun. 24, 1997

[54] CONVEYORIZED COOKING APPARATUS FOR IMPARTING CHARCOAL FLAVORING TO FOODS AND GAS-FIRED BURNER ASSEMBLY FOR USE IN SUCH APPARATUS

[76] Inventor: Robert M. Stuck, 17 Old Stage Trail, Lake Wylie, S.C. 29710

[21] Appl. No.: 683,366

[22] Filed: Jul. 18, 1996

Related U.S. Application Data

[63] Continuation-in-part of Ser. No. 46,876, Nov. 20, 1995, and Ser. No. 55,949, Jun. 17, 1996.

[51] Int. Cl.$^6$ .................................................. A47J 37/08
[52] U.S. Cl. .................... 99/391; 99/386; 99/443 C; 126/41 R; 126/41 C
[58] Field of Search ........................... 99/386, 387, 391, 99/393, 443 C; 126/41 R, 41 C

[56] References Cited

U.S. PATENT DOCUMENTS

| | | | |
|---|---|---|---|
| Re. 34,671 | 7/1994 | Long | 99/386 |
| 3,427,171 | 2/1969 | Jeppson. | |
| 3,580,164 | 5/1971 | Baker | 99/391 X |
| 3,646,878 | 3/1972 | Keller | 99/339 |
| 3,851,639 | 12/1974 | Beddoe | 126/25 R |
| 4,102,653 | 7/1978 | Simmons et al. | 44/16 R |
| 4,190,677 | 2/1980 | Robins | 426/315 |
| 4,471,748 | 9/1984 | Venable. | |
| 4,697,506 | 10/1987 | Ducate, Jr. | 99/482 |
| 4,788,962 | 12/1988 | Mashburn et al. | 126/41 R X |
| 4,850,333 | 7/1989 | Dellrud et al. | 126/41 R X |
| 4,857,074 | 8/1989 | Crace | 99/487 X |
| 4,903,683 | 2/1990 | Larsen et al. | 126/25 B |
| 4,920,872 | 5/1990 | Henry | 99/386 X |
| 4,936,286 | 6/1990 | Baker | 99/386 X |
| 5,013,563 | 5/1991 | Stuck | 426/233 |
| 5,062,408 | 11/1991 | Smith et al. | 126/41 R |
| 5,096,727 | 3/1992 | Crace | 426/314 |
| 5,121,738 | 6/1992 | Harris | 126/41 R |
| 5,421,319 | 6/1995 | Moore, Jr. et al. | 126/41 R |
| 5,427,805 | 6/1995 | Crace | 426/314 |

OTHER PUBLICATIONS

Brochure entitled "Woodstone Gas Grill Briquettes," undated.

*Primary Examiner*—Reginald Alexander
*Attorney, Agent, or Firm*—Shefte, Pinckney & Sawyer

[57] ABSTRACT

A conveyorized charcoal cooking apparatus comprises two sets of horizontally aligned gas-fueled burner assemblies arranged in staggered facing relation to one another, between which a food conveyor travels at a controlled speed, the lower burner assemblies beneath the conveyor having racks on which charcoal briquettes are supported to impart charcoal cooking and flavoring to the food in addition to the cooking energy emitted by the burners. Preferably, the briquettes are of the so-called reusable type having a ceramic binder holding the charcoal material together so as to achieve substantially more extended life of the briquettes in comparison to conventional charcoal.

24 Claims, 2 Drawing Sheets

CONVEYORIZED COOKING APPARATUS FOR IMPARTING CHARCOAL FLAVORING TO FOODS AND GAS-FIRED BURNER ASSEMBLY FOR USE IN SUCH APPARATUS

CROSS-REFERENCE TO RELATED APPLICATIONS

This is a continuation-in-part of each of co-pending U.S. patent applications Ser. No. 29/046,876, pending filed Nov. 20, 1995, entitled GAS-FIRED BURNER WITH CHARCOAL BRIQUETTE SUPPORT, and Serial No. 29/055,949, pending filed Jun. 17, 1996, also entitled GAS-FIRED BURNER WITH CHARCOAL BRIQUETTE SUPPORT.

BACKGROUND OF THE INVENTION

The present invention relates generally to conveyorized apparatus and methods for cooking foods and, in particular, to such apparatus and methods adapted for use in a commercial restaurant setting.

The grilling or barbecuing of foods, particularly meats such as hamburgers, steaks, chicken pieces, and the like, over a charcoal fire is considered by many people to be preferable to other methods of cooking because of the smoked wood flavoring charcoal grilling imparts to the food. Disadvantageously, however, charcoal grilling is generally unsuited to use as a cooking method in restaurants and other commercial settings. Because of the difficulty in regulating the temperature of a charcoal fire and the additional need to manually attend to the turning and modulation of food cooking over a charcoal fire, a significant level of skill is required to ensure consistent repeatable cooking results. Therefore, while charcoal grills would generally be desirable to use in fast-food hamburger establishments, such grills are generally unsuitable to such cooking because of the unskilled kitchen labor normally utilized in such establishments. Additionally, true charcoal has a relatively short life, typically only a couple of hours, before becoming fully combusted and requiring replenishment of fresh charcoal, which further complicates the ability of a commercial establishment to maintain a generally uniform cooking temperature and consistent cooking results over an extended period of time.

Hence, restaurants and other commercial establishments, especially fast-food hamburger restaurants, have largely ceased to grill foods over a true charcoal fire. Instead, many such establishments currently use gas-fired and electric grills, often with so-called "lava" rocks or other permanent briquettes which are heated by gas or electric burners to vaporize renderings and drippings from the food in a similar manner to that which characteristically occurs during charcoal grilling. While such grills overcome most of the disadvantages of charcoal grilling, they decidedly lack the foremost advantage of charcoal cooking, i.e., imparting a distinctive smoked wood flavoring to the food. Still other commercial restaurants utilize more sophisticated conveyorized cooking apparatus to provide an even higher level of cooking consistency, while at the same time substantially eliminating any need for skilled labor in the operation of such equipment. The principal disadvantage of such conveyorized equipment is that the cooking results are even less simulative of charcoal grilling than that achieved with electric and gas-fired grills.

SUMMARY OF THE INVENTION

It is accordingly an object of the present invention to provide a novel form of cooking apparatus by which true charcoal grilling can be accomplished with the consistency and uniformity of cooking results achieved by electric and gas grills. It is a further object of the present invention to enable charcoal grilling to be accomplished on a conveyorized basis, suitable for use in a commercial restaurant setting without requiring skilled labor.

Briefly summarized, these objectives are achieved in accordance with the present invention by a novel gas-fired burner assembly suitable for use in a conveyorized or non-conveyorized grill or other cooking apparatus for imparting charcoal flavoring to foods being cooked. According to the present invention, the burner assembly basically comprises a cooking face and means for burning a mixture of a gaseous fuel and air at the cooking face. A rack, bracket or other suitable means is affixed to the burner assembly for supporting a plurality of charcoal flavoring briquettes adjacent the cooking face so that, when the briquettes are heated to a combustion temperature, charcoal flavoring will be released to food being cooked over the burner.

Preferably, the burner is utilized in a conveyorized cooking apparatus. In one contemplated embodiment, a plurality of such burner assemblies are arranged in a generally horizontal alignment in such an apparatus for emitting cooking energy upwardly within a cooking zone above the burner assemblies. A driven food conveyor defines a generally horizontal food transport path extending through the cooking zone above the burner assemblies. The rack or bracket affixed to each burner assembly supports a plurality of charcoal flavoring briquettes in facing relation to the cooking zone. Thus, during operation, foods carried on the conveyor are cooked by the energy emitted from the burners, as well as the heat energy radiated from the briquettes. In a traditional manner, the briquettes tend to impart a smoked wood flavoring to the food, which is accentuated by the vaporization of drippings and renderings from the food which contact the briquettes.

It is preferred to utilize so-called "reusable" briquettes which, although not having an unlimited life, have a substantially extended life in comparison to conventional charcoal briquettes. For example, such "reusable" briquettes may have a combustible material, e.g., charcoal and/or wood, in combination with an essentially non-combustible binder material, such as a ceramic binder, which thereby serves to resist disintegration of the briquettes as the combustible material is expended.

DETAILED DESCRIPTION OF THE PREFERRED EMBODIMENT

Figure 1:
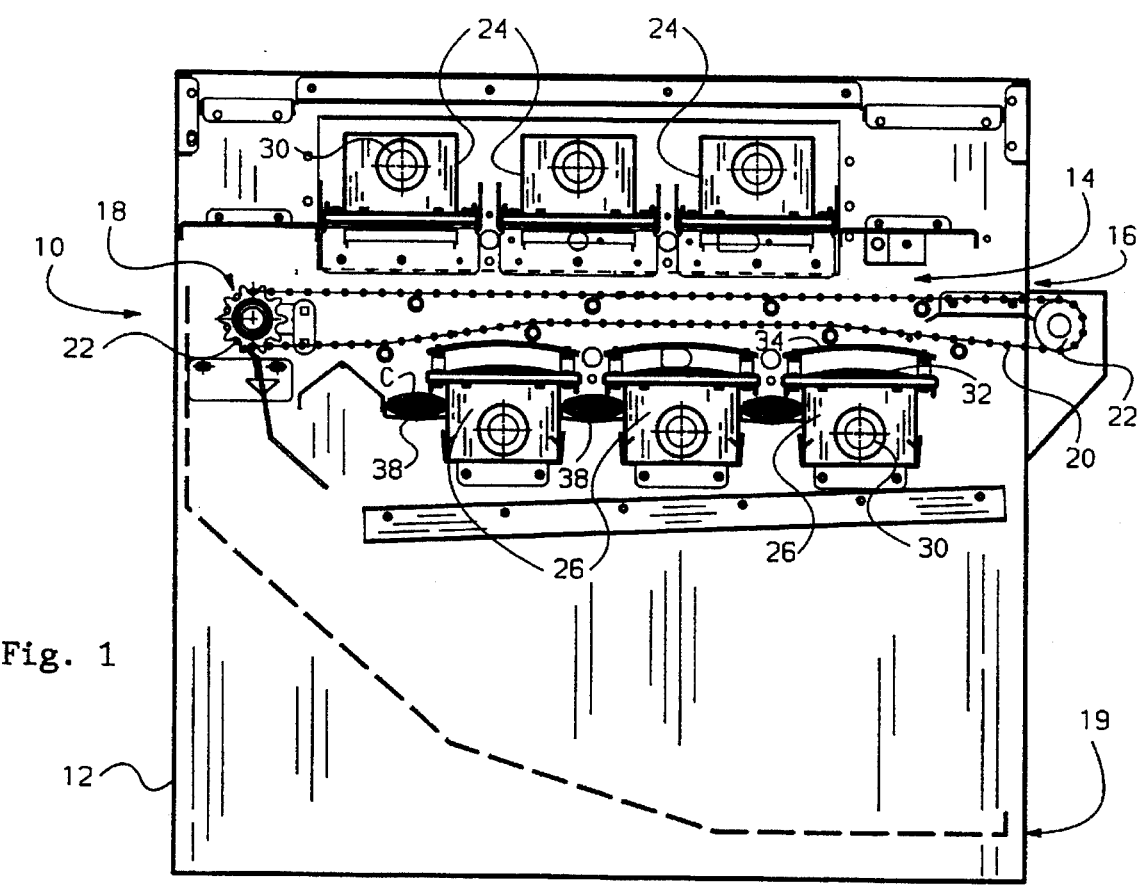
FIG. 1 is a schematic vertical cross-section of a conveyorized cooking apparatus in accordance with one preferred embodiment of the present invention.

Referring now to the accompanying drawings and initially to FIG. 1, a conveyorized cooking apparatus according to the present invention is indicated generally at 10 in an embodiment thereof preferred for the automated charcoal grilling of hamburger patties on a continuous basis in a commercial restaurant setting. However, those persons skilled in the art will readily recognize and understand that the present cooking apparatus and the novel burner assembly utilized therein are susceptible of various other specific embodiments. By way of example and without limitation, it is also possible that the burner assemblies of the present invention could be utilized in non-conveyorized cooking apparatus and, similarly, other forms of conveyorized apparatus adapted for the charcoal grilling of differing types of foods. All such variations on the present invention are intended to be within the scope and substance of the present invention.

As best seen in FIG. 1, the cooking apparatus 10 includes a housing 12 defining an interior cooking chamber 14 generally in the form of a tunnel extending horizontally the predominant lengthwise extent of the housing 12 from an entry opening 16 at the forward end of the housing 12 to a discharge location 18 at the opposite rearward end of the housing 12 directly above a food return chute extending forwardly to an exit opening 19 at the forward end of the housing 12 directly beneath the entry opening 16. An endless wire mesh conveyor 20 is trained about sprockets 22 rotatably supported by the housing 12 for traveling movement of the conveyor 20 along a horizontal food transport path extending through the tunnel lengthwise through the housing 12. One of the sprockets 22 is operatively driven by a motor (not shown), while the other sprocket 22 is mounted for free idling rotation.

A cooking arrangement is mounted within the housing 12 above and below the food transport path of the conveyor 20 to apply cooking energy within the cooking chamber 14 to food articles on the conveyor 20 from the opposite upper and lower sides thereof. In the preferred embodiment, the cooking arrangement includes a first plurality of gas-fueled burner assemblies 24 mounted to the housing 12 in generally side-by-side horizontal alignment with one another at a spacing above the food transport path of the conveyor 20 and a second like plurality of gas-fueled burner assemblies 26 similarly arranged in side-by-side horizontal alignment at a spacing beneath the food transport path of the conveyor 20.

The basic construction of each of the burner assemblies 24, 26 may be of a generally conventional type having an elongate rectangular housing 28 with a tubular gas inlet fitting 30 affixed exteriorly to one end of the housing 28 and opening interiorly to a conventional form of burner unit (not shown) effective to mix an incoming gaseous fuel, e.g., natural gas, with air to produce a continuously burning flame across an outward screen face 32 covering substantially the entirety of one side of the housing 28. Each of the burner assemblies 26 disposed beneath the food transport conveyor 20 has a plate-like shield 34 of a slightly arcuate rectangular configuration conforming in shape and dimension to the rectangular screen face 32, affixed to the housing 28 at a short spacing above the burner face 32 by upstanding bolts 36 disposed adjacent the four corners of the face 32, thereby to prevent food drippings and renderings from falling through the screen face 32 into the interior of the burner assemblies 26. The shields 34 are preferably formed of sheet metal and are heated by the respective burner assemblies 26 to a sufficient temperature to cause drippings and renderings to flash and vaporize upon contact with the shields 34.

Figure 2:
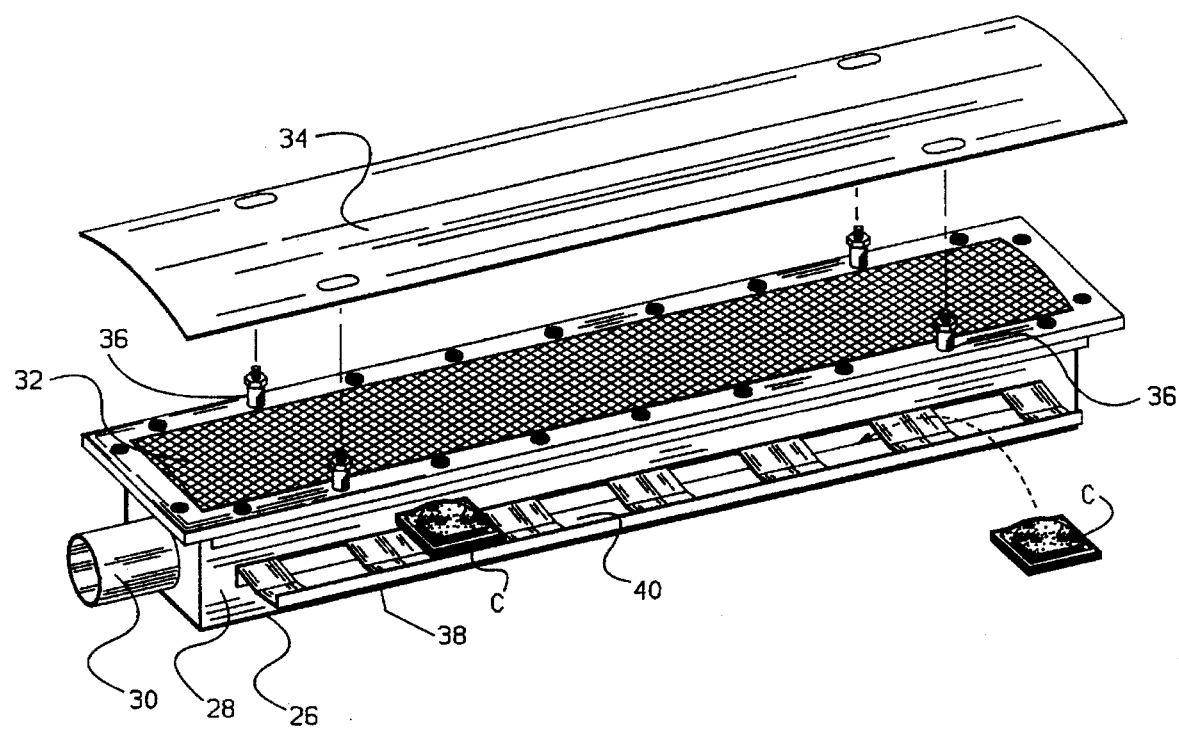
FIG. 2 is a partially exploded perspective view of one of the gas-fired burners in the cooking apparatus of FIG. 1.

The basic construction of one such burner assembly 24, 26 is shown in exploded perspective in FIG. 2. As shown in FIG. 1, the upper burner assemblies 24 are arranged with their respective screen faces 32 in generally co-planar relation to one another downwardly facing the food transport path of the conveyor 20 and, similarly, the lower burner assemblies 26 are arranged with their respective screen faces 32 in essentially co-planar relation upwardly facing the underside of the conveyor 20, thereby to apply cooking energy directly to food products carried on the conveyor 20 from both opposite sides thereof. The respective burner assemblies 24, 26 are staggered with respect to one another such that each burner assembly 24, 26 directly faces a spacing between or laterally adjacent the opposing group of burner assemblies 26, 24.

Of course, those persons skilled in the art will readily recognize and understand that the burner assemblies 24, 26 may be of essentially any conventional form of burner suitable for use in a grilling type of cooking process. Hence, it is to be understood that the present invention is not restricted to the particular form of the burner assemblies 24, 26 disclosed herein.

In accordance with the present invention, the burner assemblies 26 are modified from their conventional construction to include a support element for holding a supply of charcoal briquettes alongside the respective burner face 32 so as to face the conveyor 20 generally adjacent with the burner faces 32 between and alongside the respective burner assemblies 26 so as to be heated by the burner faces 32 of the opposing burner assemblies 24 to a charcoal combustion temperature so that the charcoal briquettes contribute to the cooking of food products on the conveyor 20 along with the burner assemblies 24, 26. As best seen in FIG. 2, each of the lower burner assemblies 26 in the preferred embodiment has an elongate rack or bracket 38 affixed lengthwise to one longitudinal side wall of the burner housing 28 to project laterally outwardly therefrom. The rack 38 is of a lateral dimension generally corresponding to that of a conventional charcoal briquette C and is formed at periodic spacings along its length with a series of openings 40 at which a corresponding plurality of charcoal briquettes C may be supported in alignment with one another.

In this manner, the charcoal briquettes C are supported to be exposed in direct facing relation to the conveyor 20 between the adjacent burner assemblies 26, without being obstructed by the shields 34 over the burner assemblies 26. Hence, once the charcoal briquettes C are heated by the burner assemblies 24, 26 to their combustion temperature, the charcoal briquettes C contribute directly to the cooking of foods moving along the transport path of the conveyor 20, with the smoke and wood flavoring released from the briquettes C being applied directly to the food to impart a traditional charcoal flavoring.

As shown in FIG. 2, each burner assembly 26 has a rack or bracket 38 along only one lengthwise side thereof, but it is to be understood that it is also contemplated that any or all of the burner assemblies 26 may have the briquette racks 38 along each opposite side. Likewise, the racks 38 may be fabricated to support a greater or lesser number of briquettes in the same or differing relative arrangements than is representatively depicted in the drawings. It may also be desirable in some circumstances to provide additional openings in the racks between the briquette support openings so as to minimize the flashing and combustion of drippings from the food. In other circumstances, the racks may have a continuous surface between the briquette support openings if desirable to contribute to the flashing and combustion of drippings and renderings. In apparatus wherein the burner assemblies are slidably mounted on a U-shaped or other support element of the housing, the racks could alternatively be mounted to such support element of the burner assemblies.

Such modifications and variations are considered to be within the scope and substance of the present invention and will be largely a matter of choice and preference depending upon a variety of factors, including but not limited to the type of food to be cooked, whether a greater or lesser degree of charcoal flavoring is desired in the food being cooked and the relative contribution to the overall cooking which is desired to be achieved by the briquettes C in relation to the burner assemblies 24, 26.

Advantageously, the cooking apparatus of the present invention, by utilizing controllable gas-fueled burner assemblies 24, 26 and by precisely predetermining the number, arrangement and disposition of the charcoal briquettes C in relation to the conveyor 20, provides the ability to regulate the cooking temperature with substantially the same degree of precision as with conventional gas-fueled grills, while achieving true charcoal grilling to impart true charcoal flavoring to the foods being cooked. The use of a controllable conveyor 20 further enables consistent cooking results to be achieved with repeatable uniformity, whereby the apparatus 10 is particularly suited to use in restaurants and other commercial establishments, without requiring skilled labor.

However, as will be understood, traditional charcoal briquettes will not experience a significantly extended life when used in the present apparatus 10 than in a traditional charcoal grill. Hence, it is preferred that the briquettes C utilized in the present cooking apparatus 10 be of the type sometimes referred to as "reusable" briquettes such as those manufactured and sold by Hickory Specialties, Inc., Box 1669, Brentwood, Tenn. 37024, under the trademark WOODSTONE. In contrast to traditional charcoal briquettes which comprise ground or pulverized solid carbonaceous wood material molded or otherwise formed into pillow-shaped briquette form by mixing of the pulverized material with starch or another binder, the WOODSTONE briquettes are formed from pulverized hardwood charcoal and wood dust molded into briquette form utilizing a natural ceramic clay instead of starch. Advantageously, therefore, whereas traditional charcoal briquettes tend to decompose and disintegrate quite rapidly as the wood charcoal combusts, often becoming fully disintegrated and combusted within one and one half to two hours, the ceramic binder in the WOODSTONE briquettes has a substantially greater resistance to decomposition and disintegration as the constituent wood charcoal combusts, whereby the combustion process is substantially prolonged. It is expected and predicted that the briquettes may have an effective life in the present apparatus of up to eight to twelve hours. Hence, it is contemplated that such briquettes would need to be changed in the present apparatus only once per day when used in a normal fast-food or other restaurant establishment. Thus, in sum, the apparatus 10 of the present invention substantially overcomes all of the aforementioned disadvantages experienced in the use of traditional charcoal grills in a commercial restaurant setting.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A conveyorized cooking apparatus for imparting charcoal flavoring to foods being cooked, the apparatus comprising means for emitting cooking energy within a cooking zone, a driven food conveyor defining a food transport path extending through the cooking zone for exposing food to the cooking energy from the cooking energy emitting means, and means for supporting charcoal flavoring elements laterally adjacent the cooking energy emitting means to be heated thereby to a combustion temperature for releasing charcoal flavoring to food on the food transport path as the food is being cooked by the cooking energy emitting means.

2. A conveyorized cooking apparatus according to claim 1, wherein the food transport path extends generally horizontally, and the cooking energy emitting means and the supporting means are disposed beneath the food transport path.

3. A conveyorized cooking apparatus according to claim 1, wherein the cooking energy emitting means comprises at least one gas-fired burner assembly arranged in facing relation to the food transport path and the supporting means extends alongside the burner assembly.

4. A conveyorized cooking apparatus according to claim 1, wherein the supporting means comprises a rack for supporting a plurality of charcoal flavoring briquettes in spaced relation to one another.

5. A conveyorized cooking apparatus according to claim 4, wherein the rack is attached to the cooking energy emitting means.

6. A conveyorized cooking apparatus according to claim 1, wherein the charcoal flavoring elements comprise briquettes having a combustible material selected from at least one of charcoal and wood in combination with an essentially non-combustible binder material.

7. A conveyorized cooking apparatus for imparting charcoal flavoring to foods being cooked, the apparatus comprising a plurality of burner assemblies in a generally horizontal arrangement for emitting cooking energy upwardly within a cooking zone above the burner assemblies, a driven food conveyor defining a generally horizontal food transport path extending through the cooking zone above the burner assemblies for exposing food to the cooking energy from the cooking energy emitting means, and means for supporting a plurality of charcoal flavoring briquettes in facing relation to the cooking zone laterally adjacent at least one of the burner assemblies to be heated thereby to a combustion temperature for releasing charcoal flavoring to food on the food transport path as the food is being cooked by the burner assemblies.

8. A conveyorized cooking apparatus according to claim 7, wherein the burners are fueled by a combustible gas.

9. A conveyorized cooking apparatus according to claim 7, wherein the supporting means comprises a rack for supporting a plurality of the charcoal flavoring briquettes.

10. A conveyorized cooking apparatus according to claim 9, wherein one said rack is disposed adjacent to each burner assembly.

11. A conveyorized cooking apparatus according to claim 7, wherein the charcoal flavoring briquettes comprise a combustible material selected from at least one of charcoal and wood in combination with an essentially non-combustible binder material.

12. A gas-fired burner assembly for use in a cooking apparatus for imparting charcoal flavoring to foods being cooked, the burner assembly comprising a cooking face and means for burning a mixture of a gaseous fuel and air at the cooking face to emit cooking energy therefrom to food to be cooked, and means disposed alongside the burner assembly for supporting a plurality of charcoal flavoring briquettes laterally adjacent the cooking face to be heated thereby to a combustion temperature for releasing charcoal flavoring to food As the food is being cooked by the cooking energy emitted from the burner face.

13. A gas-fired burner according to claim 12, wherein the supporting means comprises a rack for supporting a plurality of the charcoal flavoring briquettes.

14. A gas-fired burner according to claim 12, wherein the charcoal flavoring briquettes comprise a combustible material selected from at least one of charcoal and wood in combination with an essentially non-combustible binder material.

15. A conveyorized cooking apparatus for imparting flavoring to foods being cooked, the apparatus comprising means for emitting cooking energy within a cooking zone, a driven food conveyor defining a food transport path extending through the cooking zone for exposing food to the cooking energy from the cooking energy emitting means, and means for supporting flavoring elements laterally adjacent the cooking energy emitting means to be heated thereby to a sufficient temperature for flavoring food on the food transport path as the food is being cooked by the cooking energy emitting means.

16. A conveyorized cooking apparatus according to claim 15, wherein the food transport path extends generally horizontally, and the cooking energy emitting means and the supporting means are disposed beneath the food transport path.

17. A conveyorized cooking apparatus according to claim 15, wherein the cooking energy emitting means comprises at least one gas-fired burner assembly arranged in facing relation to the food transport path and the supporting means extends alongside the burner assembly.

18. A conveyorized cooking apparatus for imparting flavoring to foods being cooked, the apparatus comprising a plurality of burner assemblies in a generally horizontal arrangement for emitting cooking energy upwardly within a cooking zone above the burner assemblies, a driven food conveyor defining a generally horizontal food transport path extending through the cooking zone above the burner assemblies for exposing food to the cooking energy from the cooking energy emitting means, and means for supporting a plurality of flavoring briquettes in facing relation to the cooking zone laterally adjacent at least one of the burner assemblies to be heated thereby to a sufficient temperature for flavoring food on the food transport path as the food is being cooked by the burner assemblies.

19. A conveyorized cooking apparatus according to claim 18, wherein the supporting means comprises a rack for supporting a plurality of the flavoring briquettes.

20. A conveyorized cooking apparatus according to claim 19, wherein one said rack is disposed adjacent to each burner assembly.

21. A gas-fired burner assembly for use in a cooking apparatus for imparting flavoring to foods being cooked, the burner assembly comprising a cooking face and means for burning a mixture of a gaseous fuel and air at the cooking face to emit cooking energy therefrom to food to be cooked, and means disposed alongside the burner assembly for supporting a plurality of flavoring briquettes laterally adjacent the cooking face to be heated thereby to a sufficient temperature for flavoring food as the food is being cooked by the cooking energy emitted from the burner.

22. A gas-fired burner assembly according to claim 21 wherein the supporting means comprises a rack for supporting a plurality of the flavoring briquettes.

23. A burner assembly for use in a cooking apparatus for imparting flavoring to foods being cooked, the burner assembly comprising a cooking face and means for emitting cooking energy therefrom to food to be cooked, and means disposed alongside the burner assembly for supporting a plurality of flavoring briquettes laterally adjacent the cooking face to be heated thereby to a sufficient temperature for flavoring food as the food is being cooked by the cooking energy emitted from the burner.

24. A burner assembly according to claim 23 wherein the supporting means comprises a rack for supporting a plurality of the flavoring briquettes.

* * * * *